US009054539B2

(12) United States Patent
Muller et al.

(10) Patent No.: US 9,054,539 B2
(45) Date of Patent: Jun. 9, 2015

(54) ARRANGEMENT AND PROCESS FOR HOUSING ELECTRIC VEHICLE SUPPLY EQUIPMENT

(75) Inventors: Michael Muller, Harper Woods, MI (US); Charles K. Yankitis, New Baltimore, MI (US); Erol Zeren, Eden Prairie, MN (US); Jeffrey Hudnut, Berkley, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 335 days.

(21) Appl. No.: 13/484,932

(22) Filed: May 31, 2012

(65) Prior Publication Data
US 2013/0320921 A1 Dec. 5, 2013

(51) Int. Cl.
H02J 7/00 (2006.01)
B60L 11/18 (2006.01)

(52) U.S. Cl.
CPC .......... *H02J 7/0042* (2013.01); *B60L 11/1816* (2013.01); *B60L 11/1825* (2013.01)

(58) Field of Classification Search
CPC ... H02J 7/0042; H01M 10/42; Y02T 10/7088
USPC ................................................ 320/107, 109
See application file for complete search history.

(56) References Cited

U.S. PATENT DOCUMENTS

| 5,462,439 | A | 10/1995 | Keith |
| 5,548,200 | A | 8/1996 | Nor et al. |
| 5,563,491 | A | 10/1996 | Tseng |
| 5,721,481 | A | 2/1998 | Narita et al. |
| 5,803,215 | A | 9/1998 | Henze et al. |
| 6,198,251 | B1 | 3/2001 | Landon |
| 6,483,272 | B1 | 11/2002 | Terada et al. |
| 6,833,683 | B2 | 12/2004 | Winkler |
| 6,905,362 | B2 | 6/2005 | Williams |
| 7,254,468 | B2 | 8/2007 | Pillar et al. |
| 7,278,878 | B2 | 10/2007 | Draggie et al. |
| 7,579,807 | B2 | 8/2009 | Funabashi et al. |
| 7,690,453 | B2 | 4/2010 | Kinoshita et al. |
| 8,085,034 | B2 | 12/2011 | Sirton |
| 8,111,043 | B2 | 2/2012 | Redmann |

(Continued)

FOREIGN PATENT DOCUMENTS

WO 2010/055411 A1 5/2010

OTHER PUBLICATIONS

International Search Report issued in PCT/US2013/043503 on Dec. 23, 2013.

(Continued)

*Primary Examiner* — Sun Lin
(74) *Attorney, Agent, or Firm* — Baker & Hostetler LLP

(57) ABSTRACT

The invention is directed to arrangement and process for housing a battery charger. The battery charger housing arrangement includes a battery charger configured to provide power to charge a vehicle battery, a reinforcement structure configured to hold the battery charger, and a housing configured to cover the reinforcement structure and the battery charger. The housing forms a waterproof covering to protect the battery charger from the environment, a charge cable extends from the housing and is configured to connect to and charge a vehicle, and a window is arranged in the housing so that a user can operate the battery charger. The reinforcement structure is configured to structurally locate the housing in a stable non-movable location.

21 Claims, 12 Drawing Sheets

(56) References Cited

U.S. PATENT DOCUMENTS

| | | |
|---|---|---|
| 8,143,842 B2 | 3/2012 | Tyler et al. |
| 8,151,916 B2 | 4/2012 | Gearhart |
| 8,299,754 B2 | 10/2012 | Hayashigawa et al. |
| 2009/0313098 A1 | 12/2009 | Hafner et al. |
| 2010/0017249 A1 | 1/2010 | Fincham et al. |
| 2010/0174667 A1 | 7/2010 | Vitale et al. |
| 2010/0241560 A1 | 9/2010 | Landau-Holdsworth et al. |
| 2010/0268406 A1 | 10/2010 | Ito et al. |
| 2011/0029146 A1 | 2/2011 | Muller et al. |
| 2011/0074351 A1 | 3/2011 | Bianco et al. |
| 2011/0169447 A1 | 7/2011 | Brown et al. |

OTHER PUBLICATIONS

International Search Report & Written Opinion for PCT/US2012/040462, mailed Aug. 27, 2012.

International Search Report & Written Opinion for PCT/US2011/066380, prepared Jun. 13, 2012.

Robert Krause, et al., "Solid-State Relays Simplify Monitoring Electric-Car Battery Voltage," EDN, Feb. 19, 2004, 83-84.

ARRANGEMENT AND PROCESS FOR HOUSING ELECTRIC VEHICLE SUPPLY EQUIPMENT

FIELD OF THE INVENTION

The invention relates generally to an arrangement and process for housing a battery charger. More particularly, the invention relates to an arrangement and process for housing a battery charger that is located in an outside environment and protected from the environment with a housing that forms a bollard configuration.

BACKGROUND OF THE INVENTION

Vehicle batteries often need to be charged as the stored power from time to time may become depleted. This is particularly true with battery-powered vehicles, such as electric cars, that have no other means to easily self-charge. However, other types of vehicles that do typically have a self-charging capability, such as hybrid cars, can also benefit from being charged from time to time. Battery chargers for vehicles are typically stored out of the environment and when they are needed, they are brought out to the vehicle to provide charging functions. Alternatively, chargers can be left out in the environment when not being used.

In the case where battery chargers are stored out of the environment, the user of the battery charger must set aside a certain amount of storage space in order to store the battery charger, take the battery charger from its storage location and bring it to the vehicle to be charged. Additionally the user must make the proper arrangements to provide the charger with power by providing an extension cord and the like. This approach is less than beneficial in that the user must have a storage location, it takes time for the user to set up the charging system and associated extension cord, and because the charger must be exposed to the environment during the charging, it is subject to the various problems described in further detail below.

When the charger is arranged outside in the environment, the charger requires power such as an extension cord. In this regard, the extension cord typically ends up trailing along the ground. This trailing extension cord might create a safety hazard for tripping, a shock hazard, and generally a hazard for people, pets, and other vehicles that may come into proximity. Such issues are further problematic when the charger requires a larger power cord that delivers higher voltage and/or higher current such as two phase or three-phase power.

The charger is typically exposed to the environment such that the environment may cause some level of damage to the charger such as corrosion, water exposure that may short circuit or otherwise damage the electrical parts or the like. Additionally, as the charger is open to the environment, the charger might be damaged by people, pets, animals, or other vehicles accidentally or might be subject to vandalism. Further the charger being located in the environment may also be a hazard to other vehicles, people, pets, or animals due to its location, construction (sharp edges or corners), and so on. Moreover, the charger being located in an unprotected environment also leaves it susceptible to being stolen. Accordingly, such approaches are less than satisfactory for someone who needs to charge their vehicle on a regular basis. Such approaches are equally unsatisfactory for businesses and municipalities that want to provide charging capability to customers and citizens. Finally, battery chargers are often unattractive and can be unsightly.

Accordingly there is a need for a battery charger that is easy to use and access, is better protected from damage, safer for people, pets, animals and vehicles, less likely to damage the property of others, that is resistant to environmental damage, that is attractive and blends into the streetscape, simple to install, has a compact design, and includes a design that results in low cost service and maintenance.

SUMMARY OF THE INVENTION

The foregoing needs are met, to a great extent, by the invention, wherein in one aspect an arrangement and process for housing a battery in some embodiments provides a more appropriate way in which to locate and house a battery charger for charging batteries used in vehicles and the like.

In accordance with an embodiment of the invention, a battery charger housing arrangement includes a battery charger configured to provide power to charge a vehicle battery, a reinforcement structure configured to hold the battery charger, a housing configured to cover the reinforcement structure and the battery charger, wherein the housing forms a waterproof covering to protect the battery charger from the environment, a charge cable extending from the housing and configured to connect to and charge a vehicle, and a window arranged in the housing so that a user may operate the battery charger, wherein the reinforcement structure is configured to structurally locate the housing in a stable non-movable location.

In accordance with another embodiment of the invention a battery charger housing arrangement includes a battery charger configured to provide power to charge a vehicle battery, a reinforcement structure configured to hold the battery charger, a housing configured to cover the reinforcement structure and the battery charger, wherein the housing forms a waterproof covering to protect the battery charger from the environment, a charge cable extending from the housing and configured to connect to and charge a vehicle, a window arranged in the housing so that a user may operate the battery charger, and a support line configured to one of support the charge cable and retract the charge cable, the support line being connected to the housing.

In accordance with another embodiment of the invention, a process of providing a battery charger housing arrangement includes providing a battery charger configured to provide power to charge a vehicle battery, arranging a reinforcement structure configured to hold the battery charger, arranging a housing configured to cover the reinforcement structure and the battery charger, wherein the housing forms a waterproof covering to protect the battery charger from the environment, arranging a charge cable extending from the housing and configured to connect to and charge a vehicle, and arranging a window in the housing so that a user may operate the battery charger, wherein the reinforcement structure is configured to structurally locate the housing in a stable non-movable location.

There has thus been outlined, rather broadly, certain embodiments of the invention in order that the detailed description thereof herein may be better understood, and in order that the contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
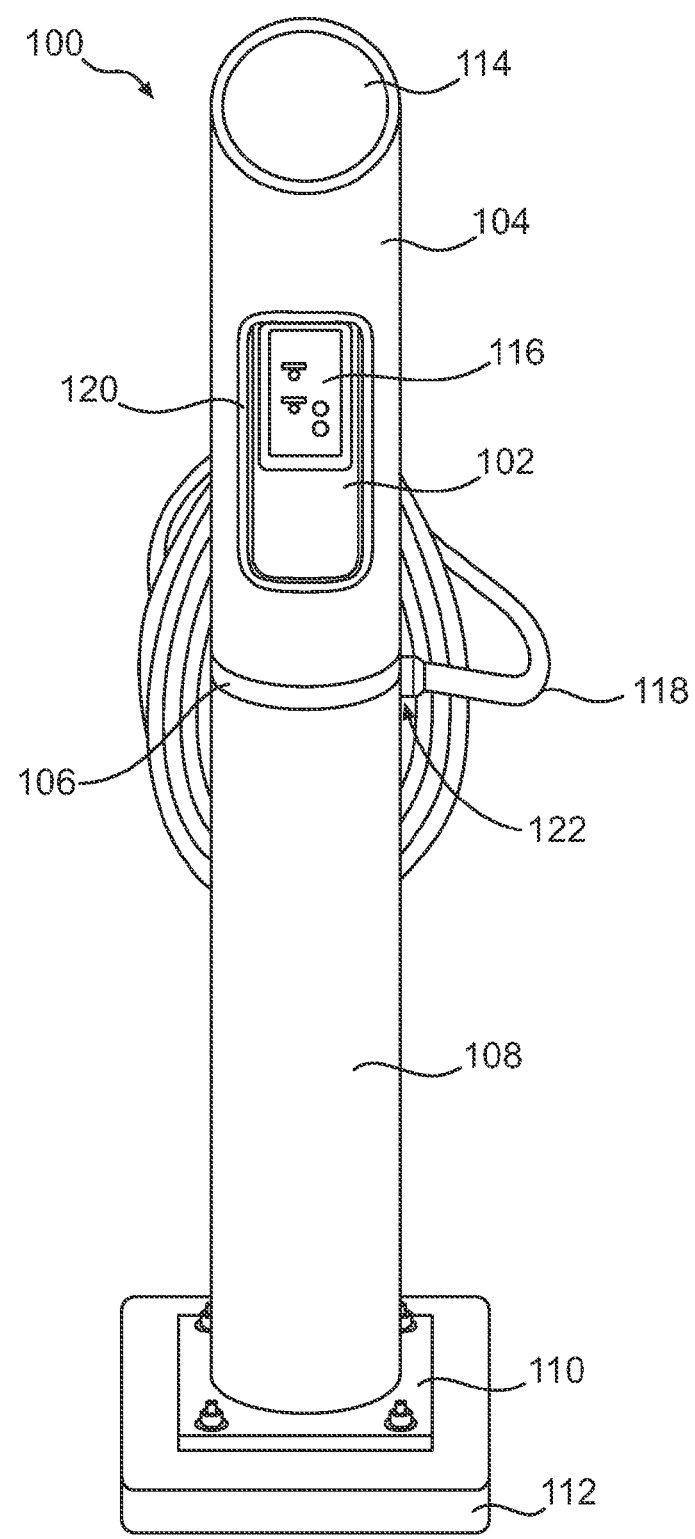
FIG. 1 shows an arrangement for housing a battery charger in accordance with one aspect of the invention.

FIG. 1 shows an arrangement for housing a battery charger in accordance with one aspect of the invention. In particular, FIG. 1 shows a housing 100 that is configured to be easy and quick to install, configured to be safer to maintain and operate, has an attractive look, robust construction, protects the battery charger and circuitry from the environment and is quick and easy for the user to connect and operate as desired. More specifically, the housing 100 includes an upper housing 104 and a lower housing 108. In between the upper housing 104 and the lower housing 108 may be a seal 106. The seal 106 may help ensure that water and other environmental elements are less likely to enter the housing 100. Additionally, the seal 106 ensures that the upper housing 104 and the lower housing 108 may align and connect with one another and form a uniform construction.

The upper housing 104 and the lower housing 108 may be constructed of a synthetic material such as plastic. However, any type of material or materials are contemplated by the invention. The chosen material may be based on strength, water resistance, wear and tear resistance, and reduced likelihood to injure individuals should they collide with the housing 100 and the like. The material may be provided with an attractive color throughout. Accordingly, if the surface of the upper housing 104 or lower housing 108 is scratched, the scratches are less noticeable. The material may include a textured surface to further make the housing 100 more attractive and less likely to show wear and tear. Additionally, the upper housing 104 and lower housing 108 are substantially water resistant such that the housing 100 protects a battery charger 116 and associated wiring that are located within the housing 100. Furthermore, the upper housing 104 may include an upper surface 114 configured to direct rainwater and the like off the top surface with an inclined surface or the like. The housing 100 may be formed and configured to be a bollard, resemble a bollard, or resemble a decorative post used to control pedestrian and vehicular traffic. Although a particular shape of the upper housing 104 and lower housing 108 is shown in FIG. 1, it is contemplated that numerous other attractive shapes could be utilized for the housing 100. Additionally the use of a two piece construction that includes the upper housing 104 and a lower housing 108 helps to make the assembly and servicing of the housing 100 and associated battery charger 116 easier and quicker. In that regard, the upper housing 104 may be simply removed by raising or sliding vertically the housing 104 upwardly to expose both the battery charger 116 and its associated circuitry. Additionally the separate housing allows for easy assembly of the charge cable 118 to extend through an associated aperture 122 in the housing 104. Nevertheless, the housing 104 and the lower housing 108 are contemplated as having a single construction in at least an aspect of the invention. Additionally, the upper housing 104 and a lower housing 108 may be constructed with few sharp corners and edges to reduce the likelihood of injuries. Furthermore, the construction of the components of the housing 100 may be height compliant with ADA requirements to ensure that a greater number of individuals may be able to utilize the system.

The housing 100 may include an access window 102 for operating and/or monitoring the condition of the battery charger 116. The access window 102 may be configured such that it extends within the housing 100 and/or arranged only on a vertical surface of the housing 100 in order to reduce exposure to the environment. Moreover, the battery charger 116 may also be configured to be exposed to the environment. Additionally, the window 102 may include a seal structure 120 to press the upper housing 104 to the battery charger 116 and create a more water resistant configuration.

The battery charger 116 may further include a charcoal filter to allow air to enter and exit from the housing of the battery charger 116. In particular the charcoal filter may allow for gases created during use of the battery charger 116 to exit the housing; and the filter the gases. Moreover the charcoal filter may include properties to reduce the intrusion of water, including for example, hydrophobic properties in order to prevent water from entering the housing of the battery charger 116.

Additionally, the battery charger 116 may include potting. The potting may include a process of filling an electronic assembly of the battery charger 116 with a solid or gelatinous compound for resistance to shock and vibration, and for exclusion of moisture and corrosive agents. For example the potting may include thermo-setting plastics or silicone rubber gels. Other suitable compositions are contemplated as well. Alternatively or additionally, a circuit board assembly of the battery charger 116 may include a layer of transparent conformal coating. The potting compound may include use low glass transition temperature (Tg) material such as polyurethane or silicone.

Moreover, the battery charger 116 and or the housing 100 may be constructed in accordance with NEMA 4X standards. NEMA 4X standards provide that: "Enclosures constructed for either indoor or outdoor use to provide a degree of protection to personnel against access to hazardous parts; to provide a degree of protection of the equipment inside the enclosure against ingress of solid foreign objects (windblown dust); to provide a degree of protection with respect to harmful effects on the equipment due to the ingress of water (rain, sleet, snow, splashing water, and hose directed water); that provides an additional level of protection against corrosion; and that will be undamaged by the external formation of ice on the enclosure."

The housing 100 may also include an attachment structure 110. The attachment structure 110 may include a plate having a plurality of apertures therein for connection to mechanical fasteners. In this regard, the mechanical fasteners may be arranged in an anchor 112. The attachment structure 110 may take any number of different configurations. For example, a metal plate, such as a steel plate with a galvanized coating. However, it should be noted that any type of attachment structure 110 is contemplated. For example, any type of structure that connects and maintains the housing 100 with respect to an anchor 112 is within the spirit and scope of the invention. In this regard, as further described with respect to FIG. 4 and FIG. 5, a number of different types of attachment structures 110 are described. Moreover, a housing 100 lacking an attachment structure 110 is also contemplated.

The anchor 112 may take any number of different configurations. For example, the anchor 112 may be a block of reinforced concrete that is arranged in or on the ground for this specific use; the anchor 112 may take the form of a portion of sidewalk, driveway, or the like that is a modified to include mechanical fasteners that line up with the holes of the attachment structure 110; or the anchor may include any other substantially horizontal surface that is stable and sufficiently strong to which to attach the attachment structure 110. In one such exemplary arrangement shown in FIG. 1, the attachment structure 110 using a base plate arrangement connects to the anchor 112 that may be a block of reinforced concrete with a four lag bolt and four hex nut arrangement. Of course, it is within the spirit and scope of the invention to use any number of and any type of mechanical fasteners. In particular, FIGS. 3 and 4 show two other exemplary types of attachment configurations as described in greater detail below.

The housing 100 may also include a configuration for the charge cable 118 to extend through an aperture 122 of the upper housing 104. In particular, the housing 100 and the aperture 122 may be configured such that the combination of the charge cable 118 and aperture 122 is substantially water resistance. Although the aperture 122 is shown in the upper housing 104, it is contemplated that the aperture 120 may be arranged anywhere on the housing 100.

Figure 2A:
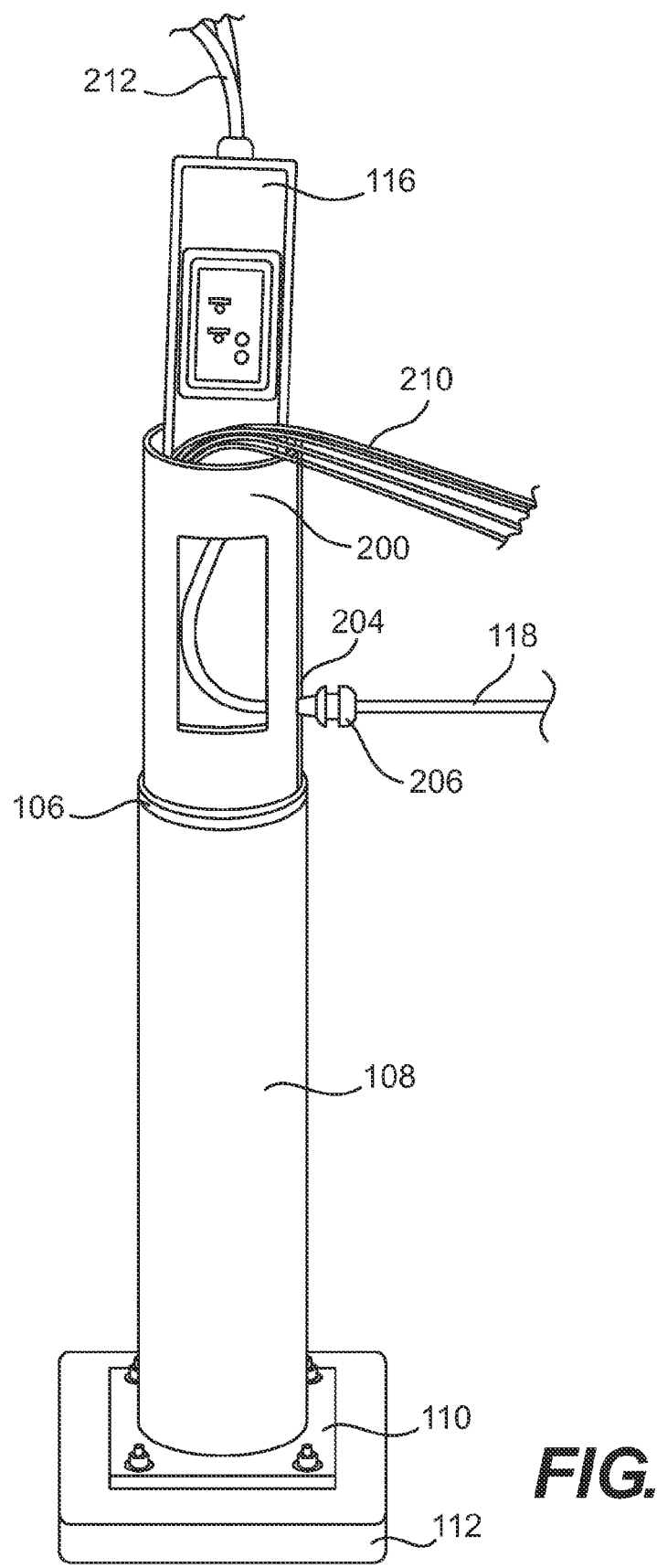
FIG. 2A shows a partially exploded view of some of the internal construction of the housing of FIG. 1.
Figure 2B:
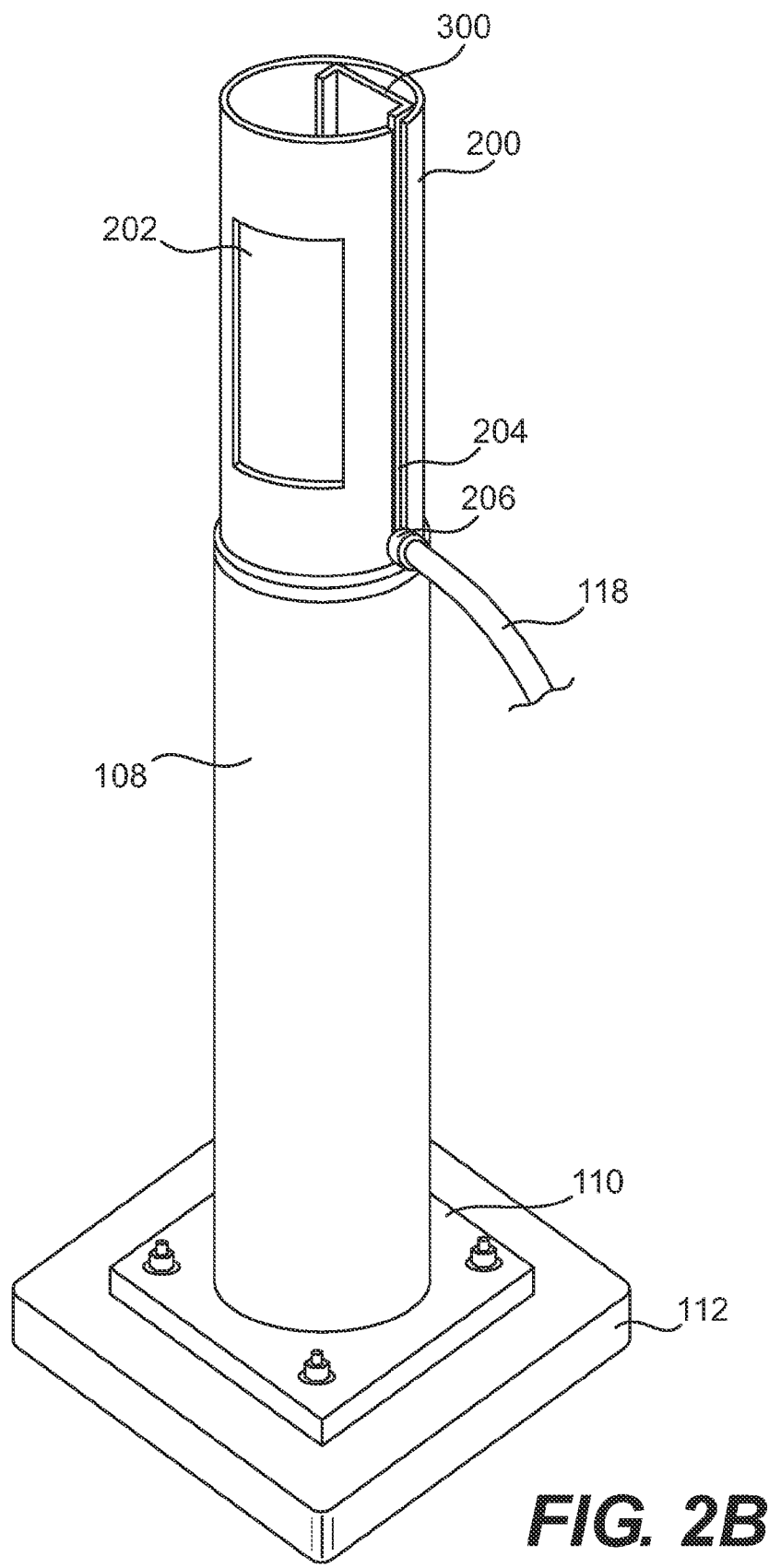
FIG. 2B shows a partial view of some of the internal construction of the housing of FIG. 1.

FIG. 2A shows a partially exploded view of some of the internal construction of the housing of FIG. 1; and FIG. 2B shows a partial view of some of the internal construction of the housing of FIG. 1. In particular, FIG. 2A shows the housing 100 with the upper housing 104 removed and the battery charger 116 partially removed. As shown in FIG. 2A, a reinforcement structure 200 is arranged within the lower housing 108. The reinforcement structure 200 would similarly be arranged within the upper housing 104 when the upper housing 104 is assembled with the lower housing 108. When the housing 100 is assembled, the upper housing 104 and lower housing 108 may be configured such that they completely cover the reinforcement structure 200 protecting it and the battery charger 116 and associated circuitry contained therein from the environment.

The reinforcement structure 200 may be configured as a cylindrical pipe, however any shape structure is contemplated by the invention including but not limited to a triangle cross-section, square cross-section, polygonal cross-section and the like. Additionally, the reinforcement structure 200 may be formed from any strong material such as a metal. In particular, it is contemplated that the reinforcement structure 200 may be formed from steel and include a galvanized coating so as to be more corrosion resistant. However, any type of a metal material may be used; and any type of coating such as paint, lacquer, powder coating and the like may optionally be applied to the metal to better prevent corrosion.

The reinforcement structure 200 may be directly connected to the attachment structure 110. For example in the implementation shown in FIGS. 1, 2A, and 2B, the attachment structure 110 is implemented as a cylindrical metallic reinforcement structure and is welded to a square base plate attachment structure 110 of a similar material. However it should be noted, that any type of connection between the reinforcement structure 200 and the attachment structure 110 is contemplated by the invention including welding, mechanical fasteners, intermediate structure, plasma welding, single piece machined configurations and the like.

Further shown in FIG. 2A is an aperture 204. In particular, the aperture 204 allows the charge cable 118 to extend out of the reinforcement structure 200. The aperture 204 may line up at least in part with the aperture 122 located in the upper housing 104. The aperture 204 and the aperture 122 may form a channel through which the charge cable 118 may extend. It is further noted that the aperture 204 and aperture 122 may not have the exact same shape. In this regard, the aperture 204 may generally have a slot shaped construction with an open top end. In contrast, the aperture 122 may be have a slot shaped construction with and open bottom end. Other shapes of the aperture 204 and aperture 122 are contemplated and are within the spirit and scope of the invention.

The configuration of the aperture 204 implemented as a slot allows an installer to slide the charge cord 118 down to the bottom of the slot. This avoids a situation where the aperture would have to be large enough to feed a cord having a socket on the end. However, that arrangement is also contemplated by the invention. The slot implementation is especially useful when the charge cable 118 includes a strain relief device 206. In this regard, the strain relief device 206 may fit snugly at the bottom of aperture 204. Although the slot shaped aperture 204 is shown in the figures, each type of aperture or other type of manner to extend the charge cable 118 from the housing 100 is contemplated by the invention. FIG. 2B shows further details of the aperture 204.

Additionally, FIG. 2A shows the battery charger 116 and wires 212 connected to the battery charger 116 to receive power, and the power wires 210 that provide power to the battery charger 116. These are shown in their disconnected states. However once the housing 100 is fully assembled, the wires 210 and wires 212 are connected in order to be operative.

The combination of the reinforcement structure 200 and the upper housing 104 and lower housing 108 has a number of advantages. In particular, the reinforcement structure 200 provides increased strength and a capability to withstand a great deal of wear and tear as it is generally formed of a metal and the upper housing 104 and lower housing 108 may be formed of a synthetic material, such as plastic, and benefit from an attractive appearance, ability to all avoid corrosion, and a surface that it is that is less likely to injure as it is softer and does not have sharp corners and edges. Accordingly, the combination of the reinforcement structure 200 and the upper housing 104 and lower housing 108 provide a beneficial balance of each of the materials best attributes.

Figure 3A:
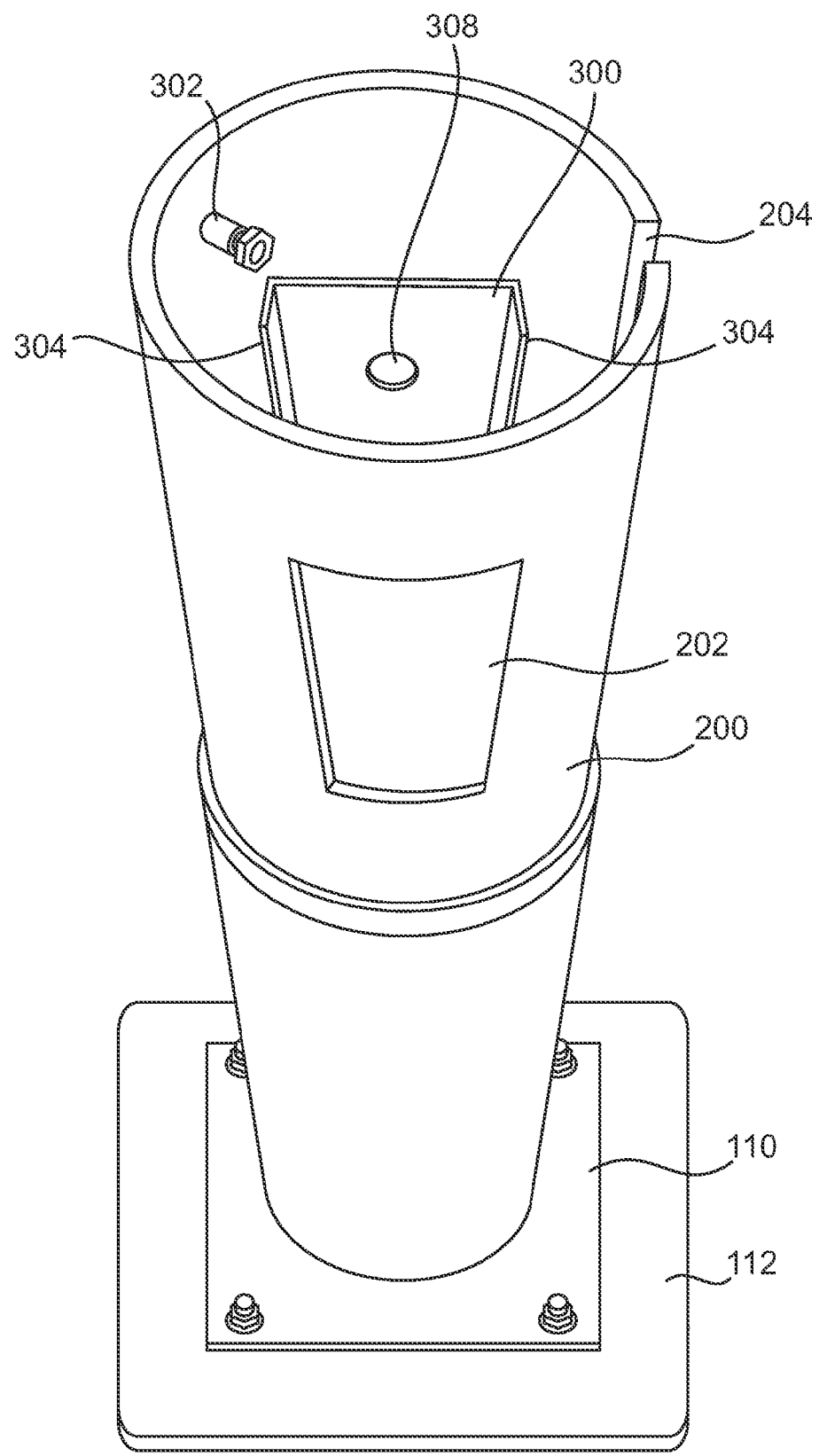
FIG. 3A shows another perspective partial view of part of the internal construction of the housing of FIG. 1.
Figure 3B:
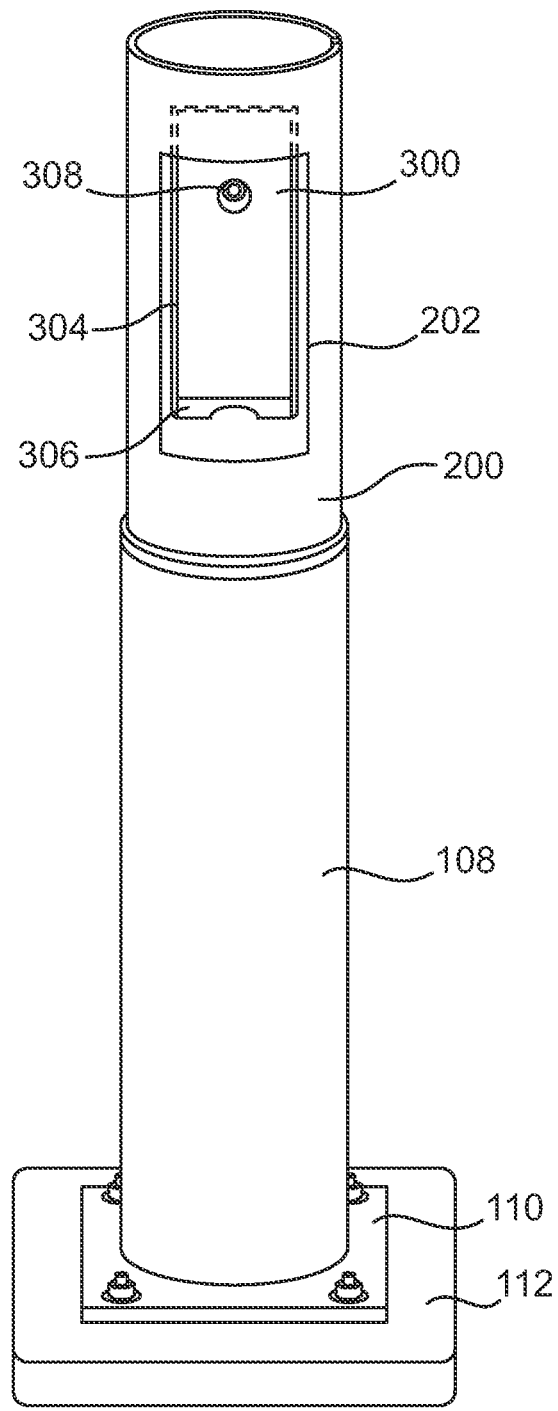
FIG. 3B shows another partial view of part of the internal construction of the housing of FIG. 1.
Figure 4:
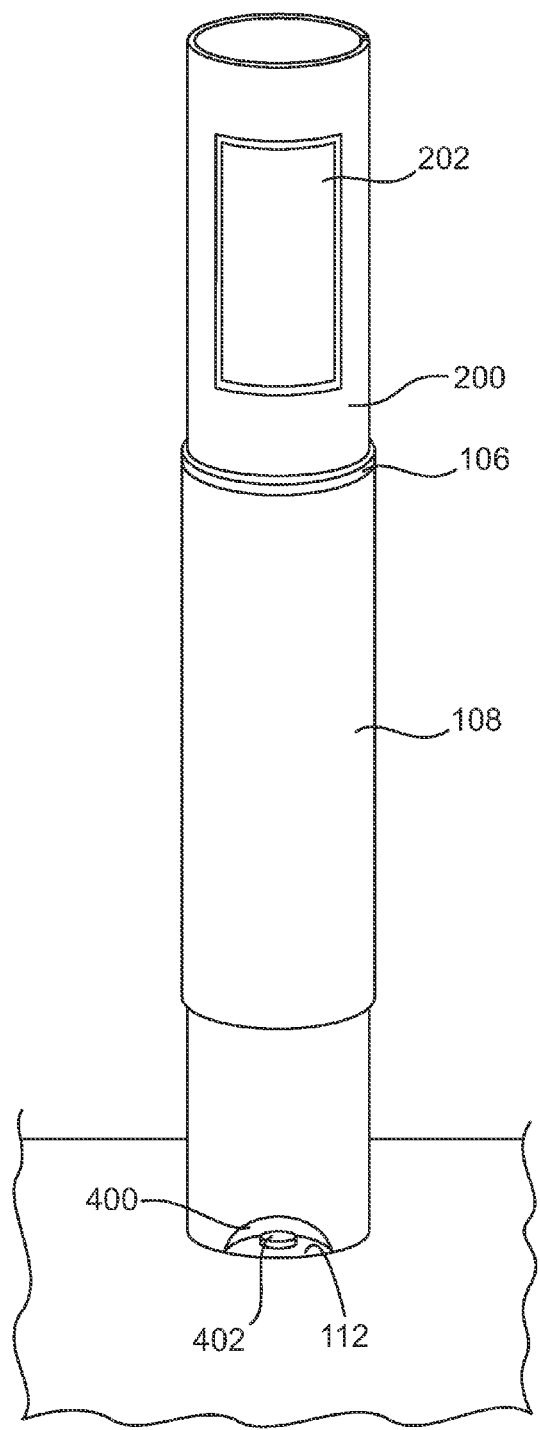
FIG. 4 illustrates one manner in which the housing is anchored to the ground according to the invention.

FIG. 3A shows another perspective partial view of part of the internal construction of the housing of FIG. 1; FIG. 3B shows another partial view of part of the internal construction of the housing of FIG. 1. In particular, FIG. 3A shows a mounting bracket 300, the details of the aperture 204 in reinforcement structure 200, and a ground connection 302. More specifically, FIG. 3A shows the aperture 204 that is implemented as a slot. FIG. 3A further showing only the upper end of the slot associated with aperture 204.

FIG. 3B shows further details of the bracket 300. The mounting bracket 300 may include a rectangular configuration with sides 304 and a bottom 306 as shown in FIG. 3B. The bottom 306 of the bracket 300 may provide support for the bottom of the battery charger 116. Likewise, the sides 304 of the bracket 300 provide side support for the battery charger 116. The mounting bracket 300 may be sized and configured to hold the battery charger 116. In this regard, the sides 304 and bottom 308 of the bracket 300 may embrace the battery charger 116 and support the same within the housing 100 and, in particular, the reinforcement structure 200. The bracket 300 may include one or more features to mechanically fasten the battery charger 116 to the bracket 300. Additionally, the bracket 300 may be a sized and include other features to allow air to provide cooling to the battery charger 116 if needed. Moreover, the bracket 300 may include an aperture 308. The aperture 308 may allow a mechanical fastener to extend from the back of the housing 100 to press against the battery charger 116 to press the battery charger 116 forward. This engagement may push the battery charger 116 arranged thereon forwardly so that the battery charger 116 engages the seal 120 (See FIG. 1) and makes a tighter more waterproof construction. This aspect is described in greater detail with respect to FIG. 6. The bracket 300 may be welded to the reinforcement structure 200, mechanically fastened to the reinforcement structure 200, or the like.

A ground connection 302 may be included in the reinforcement structure 200 and is shown arranged at an upper end of the reinforcement structure 200. In particular, the ground connection 302 may allow for the battery charger 116 and associated circuitry, power lines, and/or the like to ground the structure of the housing 100. The ground connection 302 may include a lug that is welded to the reinforcement structure 200. Other types of attachment are contemplated as well. Moreover, the ground connection 302 may include a hole in the lug and nut in order to make a full connection to a ground wire. Of course, the ground connection 302 may be arranged anywhere within the housing 100.

FIG. 4 illustrates one manner in which the housing is anchored to the ground according to the invention. In particular, FIG. 4 shows an arrangement where the reinforcement structure 200 includes an attachment structure 110 that is mounted directly to a bottom of the reinforcement structure 200. In this aspect, the attachment structure 110 is fully contained within the reinforcement structure 200. Such an arrangement may be mechanically fastened to an anchor structure 112 having a smaller footprint for example. The reinforcement structure 200 may include access 400 in the sides thereof to allow an installer to connect and work with mechanical fasteners 402 that connect the reinforcement structure 200 to the anchor structure 112. In this regard, the attachment structure 110 may include leveling aspects so that the housing 100 may be installed such that it is vertical. The leveling aspects may include long lag bolts extending from the anchor structure 112 that include an additional nut located below the attachment structure 110 so as to provide varying height upon which the attachment structure 110 is supported.

Figure 5:
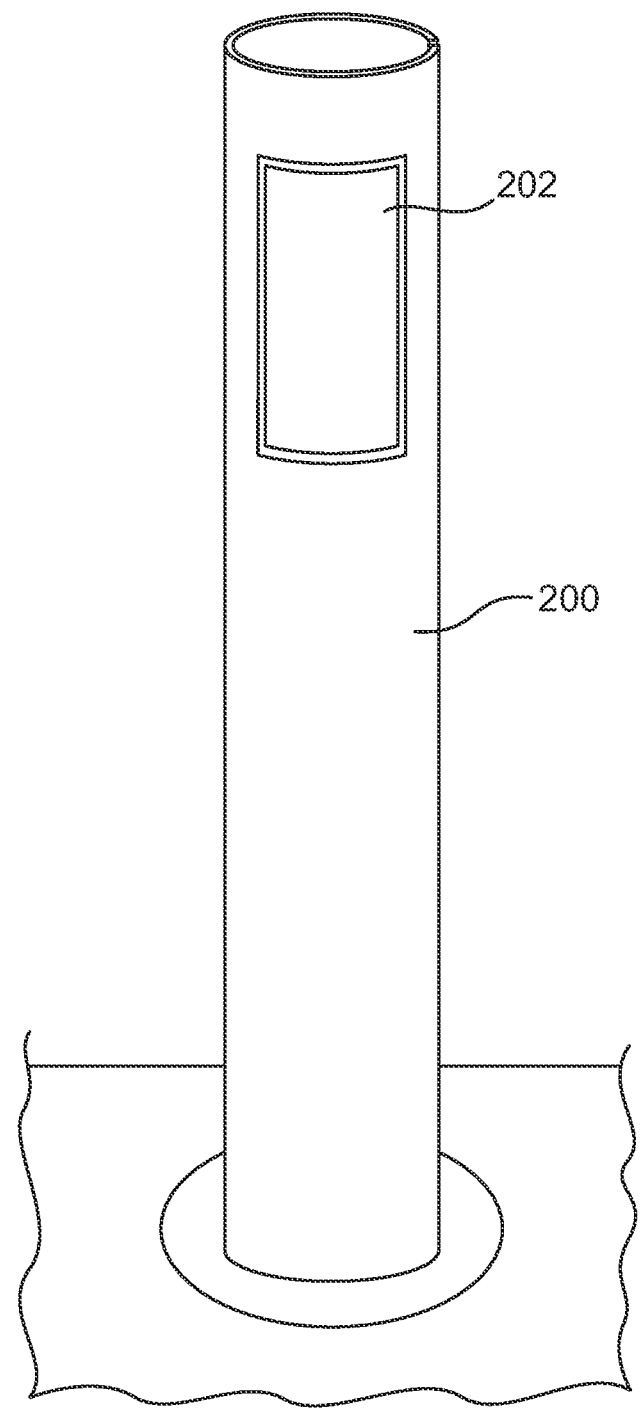
FIG. 5 shows another manner in which the housing is anchored to the ground according to the invention.

FIG. 5 shows another manner in which the housing is anchored to the ground according to the invention. As shown in FIG. 5, the reinforcement structure 200 may also be directly embedded into concrete or similar type of material including earth 502. For example, as shown in FIG. 5, an installer may simply dig a larger diameter hole in the ground, feed power lines from the hole into the reinforcement structure 200. The reinforcement structure 200 may then be arranged at the desired position in the hole. Thereafter the installer may pour concrete into the hole to create a strong base and form the anchor structure 112. Such construction of the reinforcement structure 200 may benefit from a material and/or coating that is more corrosion resistant.

Figure 6:
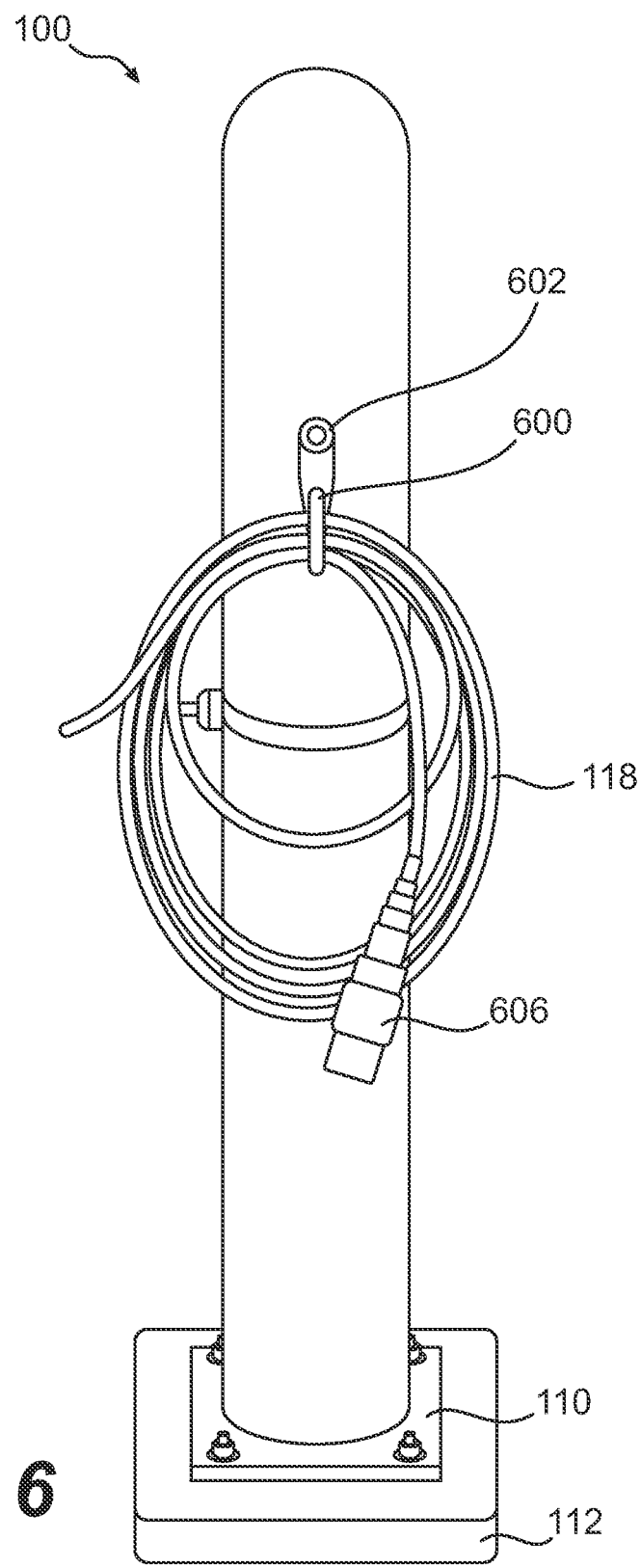
FIG. 6 shows a rear view of the housing arrangement and further shows the cable management aspects constructed according to the invention.

FIG. 6 shows a rear view of the housing arrangement and further shows the cable management aspects constructed according to the invention. In particular, FIG. 6 shows the backside of the housing 100 where the charge cable 118 may be wrapped into a series of loops and hung on a hook 600 that is arranged on the back of the housing 100. Of course, the hook 600 may be in any location with respect to housing 100; it can be positioned somewhere adjacent to the housing 100; or may not exist at all. Additionally, shown in FIG. 6 is a plug 606 that may be arranged at the end of the charge cable 118. The plug 606 may be connected to a vehicle needing power and/or to be charged.

The hook 600 may be attached to the housing 100 with a mechanical fastener 602. The mechanical faster 602 may include tamper resistant aspects such as a rounded head that requires an Allen wrench to install. Other types of tamper resistant mechanical fasteners or construction are contemplated.

The mechanical fastener 602 may have the additional benefit of mechanically attaching the upper housing 104 more securely to the reinforcement structure 200. More specifically the mechanical fastener 602 may extend through the hook 600, through an aperture in the upper housing 104 and into an aperture in the reinforcement structure 200 and engage threads that may be arranged in the aperture of the reinforcement structure 200. Additionally, the mechanical fastener 602 may be sized so as to extend into the reinforcement structure 200 through aperture 308 (see FIGS. 3A and 3B). This engagement may push the battery charger 116 arranged thereon forwardly so that the battery charger 116 engages the seal 120 (See FIG. 1) and makes a tighter more waterproof construction.

Figure 7:
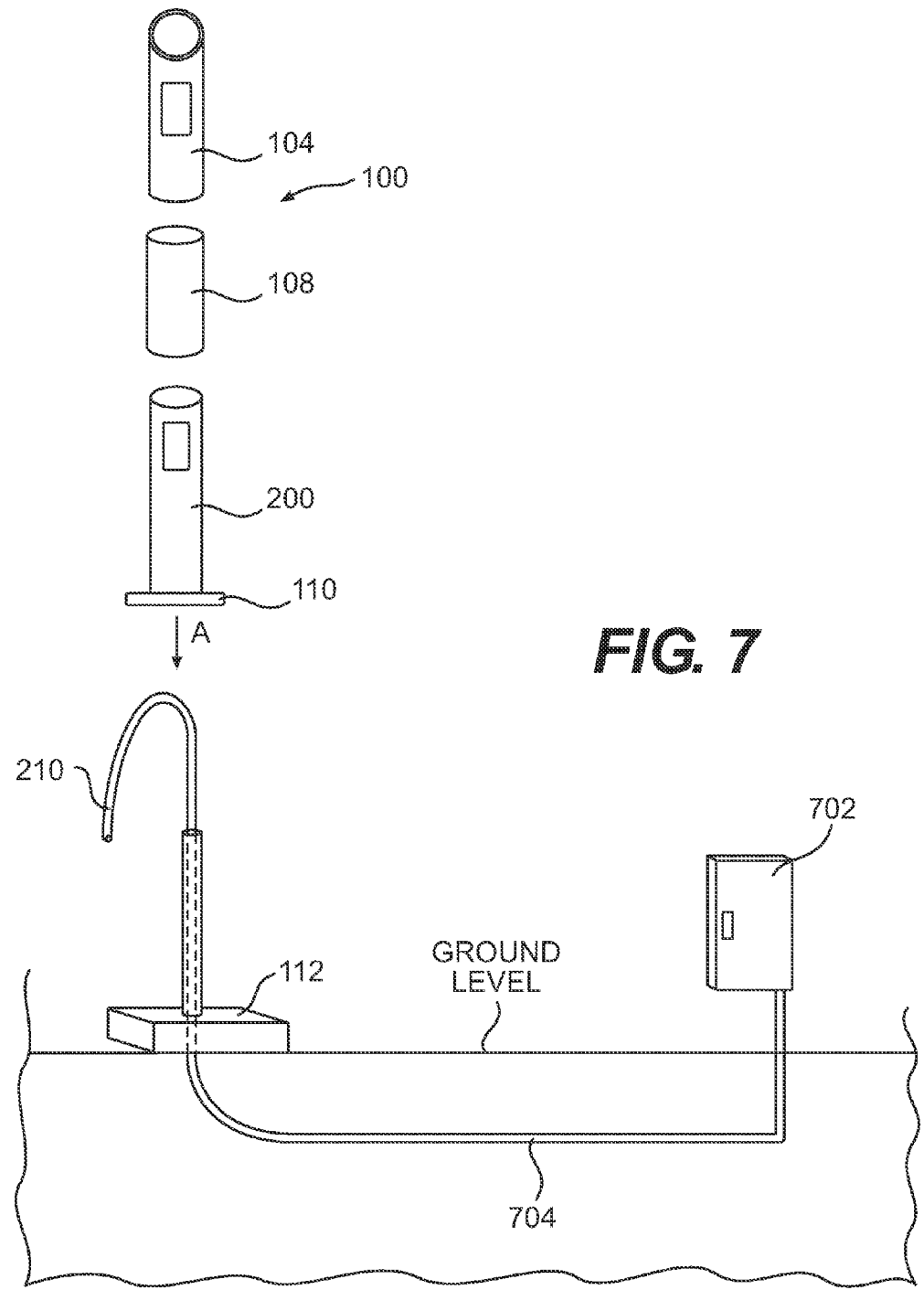
FIG. 7 shows a schematic of the connection between a service panel and the anchor.

FIG. 7 shows a schematic of the connection between a service panel and the housing. In particular, FIG. 7 shows an electrical power arrangement for the feeding power to the housing 100 and associated battery charger 116. In this exemplary schematic, electrical power from a service panel 702 may be routed underground through various means to the anchor 112. In this regard, by guiding the electrical power underground, the hazard that an extension cord and the associated messy look of an extension cord across the ground is avoided. Additionally the problems with the associated electrical hazard of the same are also avoided.

As further shown in FIG. 7, power wires 704 from the service panel 702 may be guided through a conduit or some other type of arrangement that is consistent with local building codes to the anchor 112. If a conduit is used, the conduit may extend up and out of the anchor 112 so that the reinforcement structure 200 and housing 100 may be arranged and constructed thereon. In particular, the reinforcement structure 200 and housing 100 may be moved in the direction of Arrow A during assembly.

Figure 8:
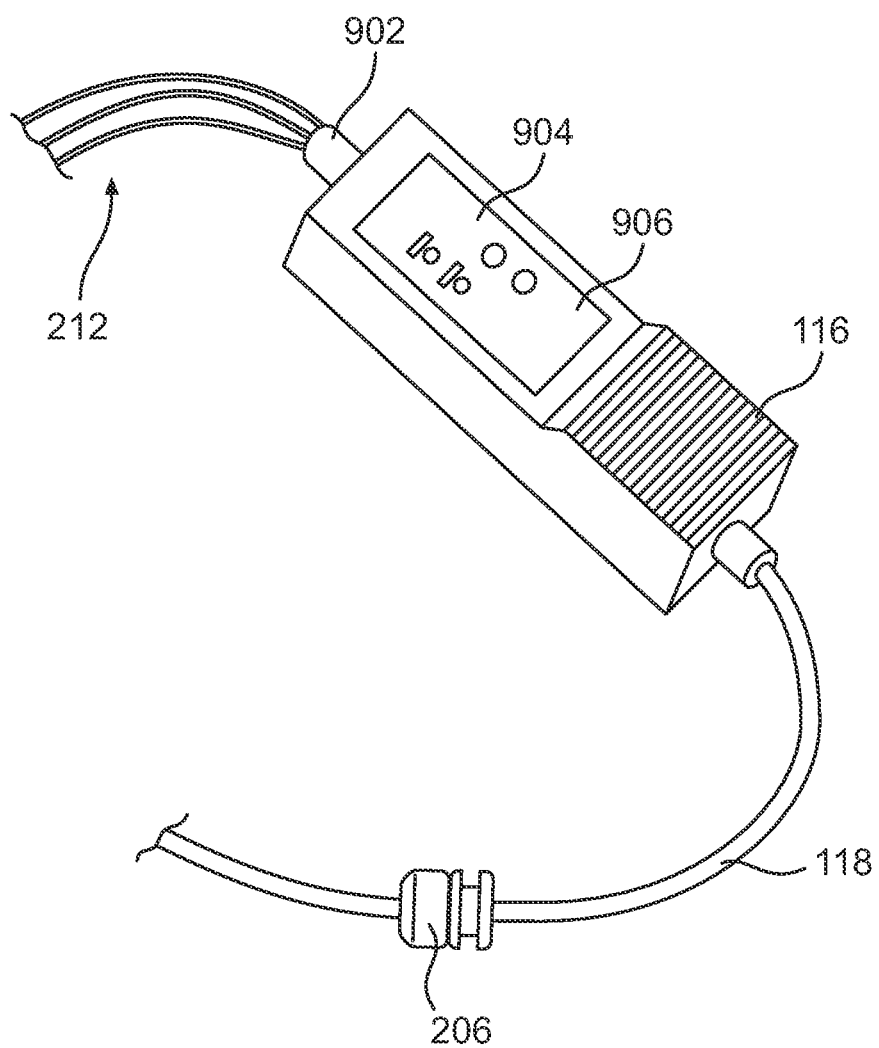
FIG. 8 shows the construction of the battery charger according to the invention.

FIG. 8 shows the construction of the battery charger according to the invention. The battery charger 116 may include waterproof connector 902 and power wires 212. The waterproof connector 902 may include a construction that keeps water from being able to seep into the internal structure of the battery charger 116. The power wires 212 may extend from the top of the battery charger 116. The power wires 212 may extend up into the upper part of the upper housing 104 better ensuring that it is less likely that the power wires 212 may be exposed to water. Additionally the power wires 210 also may further extend into the upper portion of the upper housing 104 for the same reasons. Waterproof wire nuts may be used to connect the power wires 212 to the power wires 210. The battery charger 116 may also be configured for various input voltages and currents. The battery charger 116 may be configured to operate based on one, two, or three phase circuits. Additionally, the battery charger 116 may be configured to operate on different current circuits. More specifically, the circuit of the battery charger 116 may include the ability to be adjusted to operate with different current sources as desired by the user. In particular, the battery charger 116 may include a circuit to provide a digital input to the battery charger 116. The digital input indicating an operating current for the battery charger 116. In one particular aspect, the digital input may be a binary coded decimal. The binary coded decimal may be generated by a dial based input component. The battery charger 116 may be a modified SPX™ Power Xpress EVSE, model no. EL-50600 available from SPX, Warren, Mich., USA. However, it is contemplated that other types of battery charges may be used.

FIG. 8 also shows the strain relief device 206. The strain relief device 206 may include a narrowed portion 800. The narrowed portion 800 may be the portion that is positioned in the slot associated with aperture 204. This construction provides a more waterproof arrangement.

The battery charger 116 may include a display screen 904 and input device 906. The display screen 904 may permit a user to see various conditions of the battery as detected by the battery charger 116. In addition, the display screen 904 may also display questions to which the user may input a response via the input device 906. In some embodiments of the invention, the input device 906 may be a keyboard. In other embodiments of the invention, the input device 906 can include any device that can input data into the battery charger 116. The input device 906 may also not be a separate feature from the display screen 904 but may be part of the display screen 904 such as a touch screen. The input device 906 may not be a standard keyboard but may be merely various keys having functions when pressed. Any other suitable means for inputting data may be incorporated as part of the input device 906.

Figure 9:
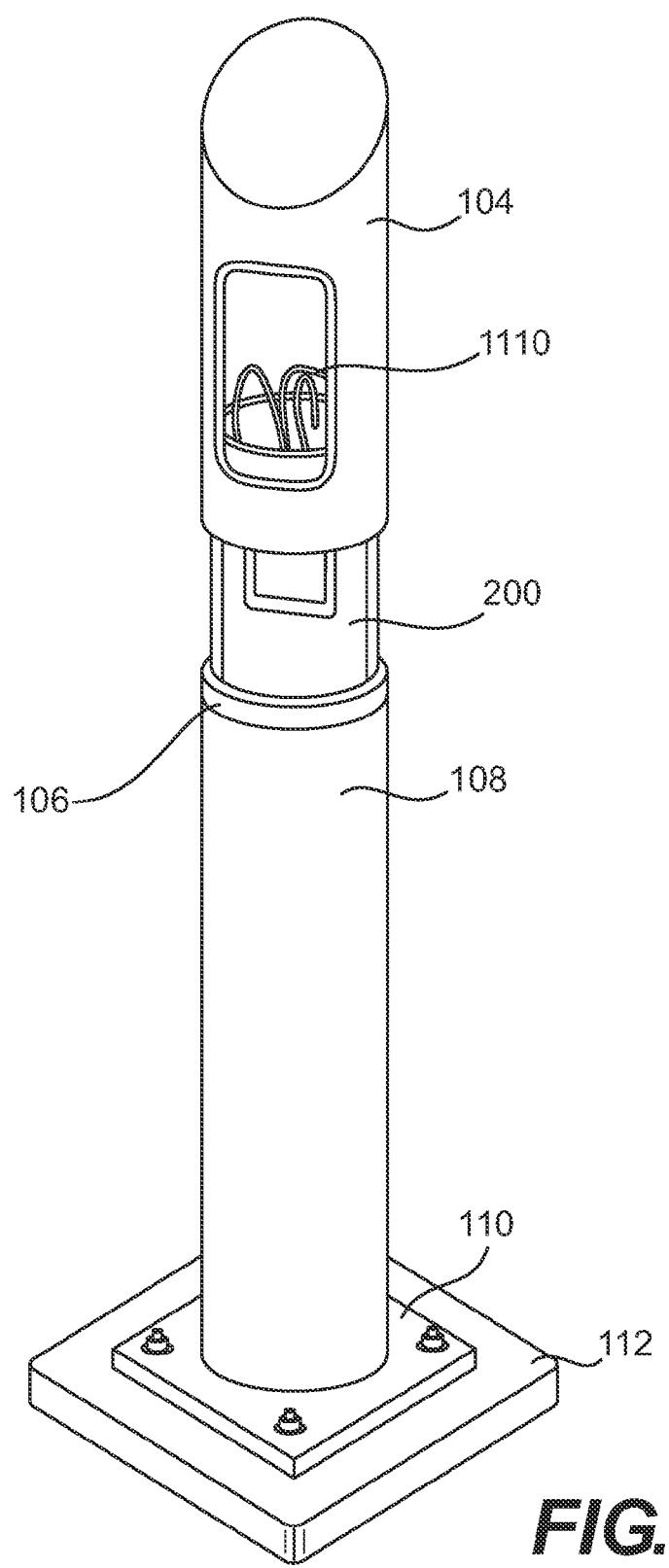
FIG. 9 shows the housing of FIG. 1 with a portion of the housing partially installed/removed.

FIG. 9 shows the housing of FIG. 1 with a portion of the housing being installed/removed. In particular, wiring connections 1110 are shown that result from the connection of the power wires 212 being connected to the power wires 210. Once the wiring connections 1110 are formed, the upper housing 104 may be slid down over the upper portion of the reinforcement structure 200 to connect with seal 106. Thereafter, the hook 600 and associated mechanical fastener 602 may be installed to connect the upper housing 104 to the housing 100 when the housing 100 is implemented with the same. During maintenance of the housing 100, battery charger 116, or the like, the upper housing 104 may be simply removed by removal of the mechanical fastener 602 and hook 600 followed by an upward sliding movement as shown in FIG. 9. Accordingly, maintenance on the housing 100 is simplified.

Figure 10:
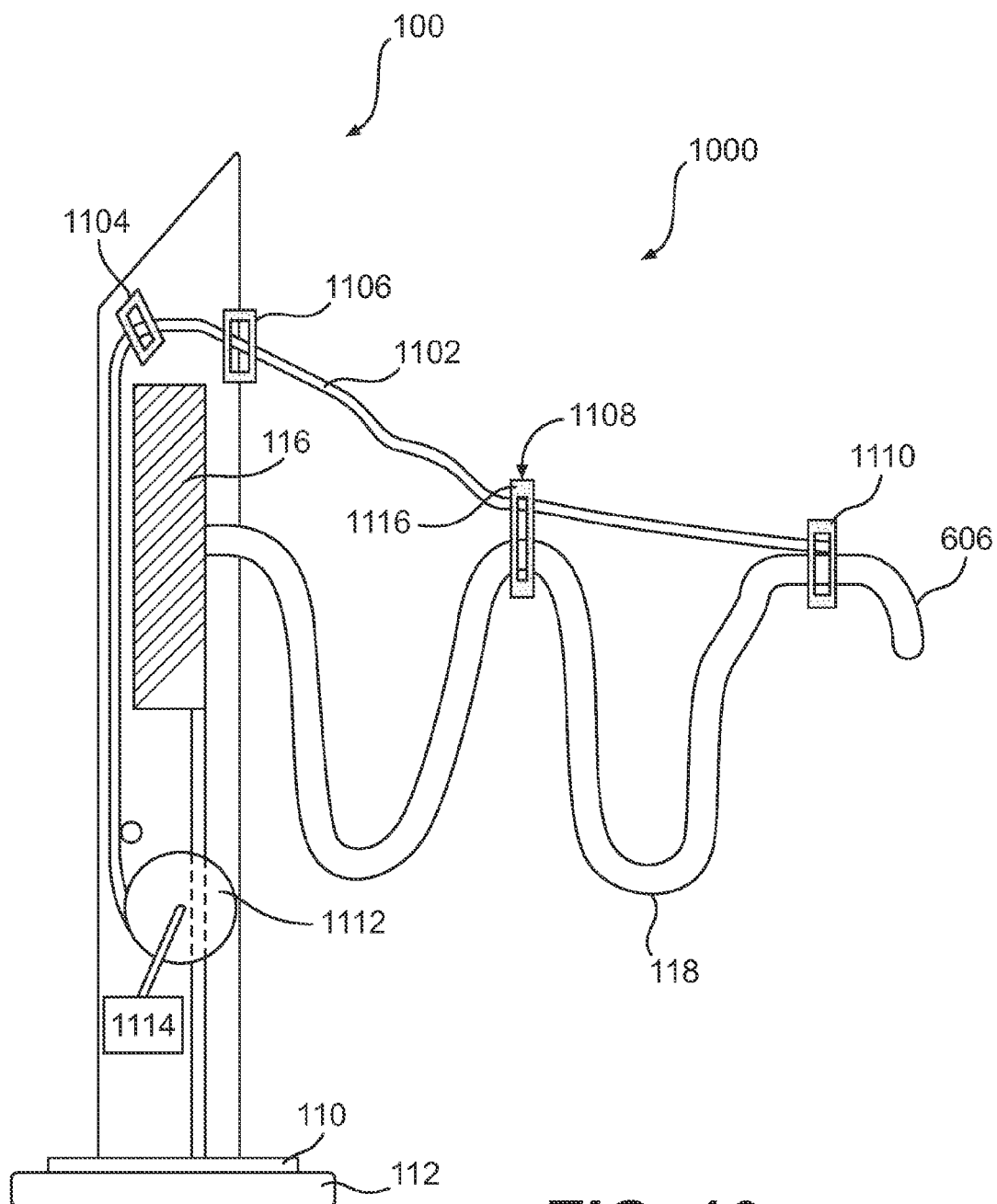
FIG. 10 shows an internal arrangement for housing a battery charger having a cable management system in accordance with a further aspect of the invention.

FIG. 10 shows an internal arrangement for housing a battery charger having a cable management system in accordance with a further aspect of the invention. In particular, FIG. 10 shows an aspect of the housing 100 that includes a charge cable management system 1000. As shown in other aspects of the invention, the charge cable 118 may be looped and secured on a hook 600 as shown in FIG. 6. The aspect shown in FIG. 10 utilizes substantially all the same structure except the hook 600. The FIG. 10 aspect further includes a support line 1102 to help manage the charge cable 118. In this regard, the support line 1102 may hold one or more portions of the charge cable 118 to keep the charge cable 118 off the ground, guide it back to the housing 100, or the like.

The support line 1102 may be fixed to the top of housing 100, the support line 1102 may be configured to move with respect to housing 100 or the support line 1102 may be configured to move into the housing 100. If the support line 1102 is fixed to the top of housing 100, then the support line 1102 may be configured as an elastic cord or the like. Such an arrangement may allow a user to stretch the support line 1102 and move the charge cable 118 to the vehicle as desired. Once the vehicle is no longer being charged, the charge cable 118 may be easily guided to the housing 100 by the elastic nature of the support line 1102. This arrangement provides for a generally more attractive and more user-friendly approach to cord management.

The support line 1102 may also be configured to move with respect to housing 100. Again, the support line 1102 may be elastic with a portion being located within the housing 100. This may provide a longer support line 1102 with greater elastic qualities. Again, this may allow a user to stretch the support line 1102 and move the charge cable 118 to the vehicle as desired. Once the vehicle is no longer being charged, the charge cable 118 may be easily guided to the housing 100 by the elastic nature of the support line 1102.

In another implementation, the housing 100 may include a mechanism to move the support line 1102 with respect to the housing 100. The charge cable management system 1000 may include for example, roll system 1112 to gather and maintain the support line 1102 within housing 100. The roll system 1112 may be implemented to roll up the support line 1102. The roll system 1112 may be actuated by a spring, electric motor, or the like 1114. In this regard, pulling the charge cable 118 away from housing 100 may also extend the support line 1102 from the housing 100 and the roll system 1112 as well. During this action, the support line 1102 may be unrolled from the roll system 1112. When use of the charge cable 118 is finished, the roll system 1112 may urge the support line 1102 to roll onto the roll system 1112.

The roll system 1112 may utilize a spring-based system 1114 where the unrolling may wind a spring. When the charging is complete, the charge cable 118 may be urged by the support line 1102 by the spring-based system 1114 urging the roll system 1112 to rotate to roll up the support line 1102 and move the charge cable 118 closer to the housing 100. Additionally the housing 100 may include one or more pulleys or grommets 1104, 1106 to guide the support line 1102 towards the roll system 1112.

Alternatively, the roll system 1112 may utilize a motor-based system 1114. When the charging is complete, the charge cable 118 may be urged by the support line 1102 by the motor-based system 1114 to rotate the motor of the roll system 1112 to rotate to roll up the support line 1102 and move the charge cable 118 closer to the housing 100. Again, the housing 100 may include one or more pulleys or grommets 1104, 1106 to guide the support line 1102 towards the roller system 1112.

In the aspect shown in FIG. 10, the support line 1102 may connect near or to the plug 606. In a further aspect, this connection of the support line 1102 may be the only connection to the charge cable 118. In the aspect shown in FIG. 10, the support line 1102 may also connect to the charge cable 118 at an intermediate location along the charge cable 118 to support the same. More specifically the support line 1102 may attach at or near the plug 606 and also at a line holder 1108.

In one particular implementation, the line holder 1108 may include a loop structure 1116 that allows free movement of the support line 1102 therethrough. The line holder 1108 may be fixedly secured to the charge cable 118 through an attachment structure 1118. Furthermore, the loop 1116 may be attached to the attachment structure 1118 and extend from the attachment structure 1118. The loop 1116 may include an opening wider than the support line 1102. This allows the support line 1102 to move through the loop 1116 and allow the charge cable 118 free movement to extend and flex from the housing 100 to the vehicle that requires power. Once the support line 1102 is retracted by the roll system 1112, the support line 1102 may slide through the line holder 1108, hold the plug 606 and the line holder 1108 close to the housing 100. Although a single fixed connection of the line attachment 1110 is shown, more than one fixed connection may be implemented and is contemplated by the invention. Furthermore, although a single line holder 1108 is shown, more than one line holder 1108 may be implemented and is contemplated by the invention.

Although a specific implementation of such a cable management system is described herein, it is within the spirit and scope of the invention to use any type of cable management system.

Accordingly the aspects described above result in a housing for a battery charger that is easy to use and access, is better protected from damage, safer for people, pets, animals and vehicles, less likely to damage the property of others, that is resistant to environmental damage, that is attractive and blends into the streetscape, simple to install, has a compact design, and includes a design that results in low cost service and maintenance.

The many features and advantages of the invention are apparent from the detailed specification, and thus, it is intended by the appended claims to cover all such features and advantages of the invention which fall within the spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A battery charger housing arrangement comprising:
   a battery charger configured to provide power to charge a vehicle battery;
   a reinforcement structure configured to hold the battery charger;
   a housing configured to cover the reinforcement structure and the battery charger, wherein the housing forms a waterproof covering to protect the battery charger from an outdoor environment;
   a charge cable extending from the housing and configured to connect to and charge a vehicle; and
   a window arranged in the housing, the window allows a user to operate the battery charger,
   wherein the reinforcement structure is configured to structurally locate the housing in a stable non-movable location.

2. The battery charger housing arrangement according the claim 1 further comprising:
   an anchor configured to be arranged either in a ground or on the ground; and
   an attachment structure configured to be mounted to the anchor and support the housing.

3. The battery charger housing arrangement according the claim 1 wherein the
   reinforcement structure is constructed of a metallic material; and
   wherein the housing is formed of a synthetic material.

4. The battery charger housing arrangement according the claim 1
   wherein the reinforcement structure comprises a substantially cylindrical configuration;
   wherein the housing comprises a substantially cylindrical configuration; and
   wherein the housing comprises a circular footprint.

5. The battery charger housing arrangement according the claim 1 wherein the housing comprises an upper housing portion and a lower housing portion, which are separated and having a seal arranged therebetween.

6. The battery charger housing arrangement according the claim 1 wherein the housing is configured to receive power from underground conduits.

7. The battery charger housing arrangement according the claim 1 wherein the housing is configured to slide vertically in order to service the battery charger.

8. The battery charger housing arrangement according the claim 1 wherein the window comprises a seal to form a substantially waterproof seal between the battery charger and the housing.

9. The battery charger housing arrangement according the claim 1 wherein the housing comprises a bracket to hold the battery charger.

10. The battery charger housing arrangement according the claim 1 wherein the housing is further configured to attach to one of an anchor, a sidewalk, or a driveway.

11. The battery charger housing arrangement according the claim 1 wherein the charge cable comprises a support line configured to either support the charge cable or retract the charge cable, the support line being connected to the housing.

12. The battery charger housing arrangement according the claim 11 wherein the support line comprises a retraction system to retract the charge cable to the housing.

13. The battery charger housing arrangement according the claim 1 further comprising a circuit to select an input current.

14. A battery charger housing arrangement comprising:
   a battery charger configured to provide power to charge a vehicle battery;
   a reinforcement structure configured to hold the battery charger;
   a housing configured to cover the reinforcement structure and the battery charger, wherein the housing forms a waterproof covering to protect the battery charger from an outdoor environment;
   a charge cable extending from the housing and configured to connect to and charge a vehicle;
   a window arranged in the housing, the window allows a user to operate the battery charger; and a support line configured to either support the charge cable or retract the charge cable, the support line being connected to the housing.

15. The battery charger housing arrangement according the claim 14 wherein the support line comprises a retraction system to retract the charge cable to the housing.

16. The battery charger housing arrangement according the claim 14 further comprising:
an anchor configured to be arranged either in the ground or on the ground; and
an attachment structure configured to be mounted to the anchor and support the housing.

17. A process of providing a battery charger housing arrangement comprising:
providing a battery charger configured to provide power to charge a vehicle battery;
arranging a reinforcement structure configured to hold the battery charger;
arranging a housing configured to cover the reinforcement structure and the battery charger, wherein the housing forms a waterproof covering to protect the battery charger from an outdoor environment;
arranging a charge cable extending from the housing and configured to connect to and charge a vehicle; and
arranging a window in the housing, the window allows a user to operate the battery charger,
wherein the reinforcement structure is configured to structurally locate the housing in a stable non-movable location.

18. The process according the claim 17 further comprising:
arranging an anchor configured to be arranged either in the ground or on the ground; and
arranging an attachment structure configured to be mounted to the anchor and support the housing.

19. The process according the claim 17 wherein the reinforcement structure is constructed of a metallic material, and wherein the housing is formed of a synthetic material.

20. The process according the claim 17 wherein the reinforcement structure comprises a substantially cylindrical configuration,
wherein the housing comprises a substantially cylindrical configuration; and
wherein the housing comprises a circular footprint.

21. The process according the claim 17, wherein the housing comprises an upper housing portion and a lower housing portion, which are separated and having a seal arranged therebetween;
wherein the housing is configured to receive power from underground conduits;
wherein the housing is configured to slide vertically in order to service the battery charger;
wherein the housing comprises a bracket to hold the battery charger; and
wherein the housing is configured to attach to one of an anchor, a sidewalk, or a driveway.

* * * * *